US009240583B2

(12) United States Patent
Hidaka et al.

(10) Patent No.: US 9,240,583 B2
(45) Date of Patent: Jan. 19, 2016

(54) CARBOXYMETHYLCELLULOSE OR SALT THEREOF FOR ELECTRODES OF NONAQUEOUS ELECTROLYTE SECONDARY BATTERY AND AQUEOUS SOLUTION THEREOF

(75) Inventors: Yasuhiro Hidaka, Tokyo (JP);
Kazuhiro Fujiwara, Shimane (JP);
Kazuhiko Inoue, Shimane (JP); Shinji Satou, Shimane (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 602 days.

(21) Appl. No.: 13/131,395

(22) PCT Filed: Nov. 26, 2009

(86) PCT No.: PCT/JP2009/069915
§ 371 (c)(1),
(2), (4) Date: May 26, 2011

(87) PCT Pub. No.: WO2010/061871
PCT Pub. Date: Jun. 3, 2010

(65) Prior Publication Data
US 2011/0229760 A1    Sep. 22, 2011

(30) Foreign Application Priority Data

Nov. 26, 2008 (JP) .................................. 2008-300318

(51) Int. Cl.
*H01M 4/62* (2006.01)
*H01M 4/04* (2006.01)
*H01M 4/133* (2010.01)
*H01M 4/1393* (2010.01)

(52) U.S. Cl.
CPC ............ *H01M 4/0402* (2013.01); *H01M 4/133* (2013.01); *H01M 4/1393* (2013.01); *H01M 4/621* (2013.01); *H01M 4/622* (2013.01); *Y02E 60/122* (2013.01); *Y10T 29/49115* (2015.01); *Y10T 428/2982* (2015.01)

(58) Field of Classification Search
CPC . H01M 4/0402; H01M 4/133; H01M 4/1393; H01M 4/621; H01M 4/622; Y02E 60/122; Y10T 29/49115; Y10T 428/2982
USPC ......................................... 429/217; 29/623.5
See application file for complete search history.

(56) References Cited

U.S. PATENT DOCUMENTS

| 4,499,214 A * | 2/1985 | Sortwell ........................ 523/336 |
| 4,640,622 A * | 2/1987 | Sortwell ........................ 366/76.3 |
| 4,820,813 A * | 4/1989 | Schulz ............................. 536/84 |
| 4,883,537 A * | 11/1989 | Burdick .................... 106/197.01 |
| 5,147,937 A * | 9/1992 | Frazza et al. ................... 525/243 |
| 6,800,593 B2 * | 10/2004 | Dobson et al. ................. 507/110 |
| 2005/0074669 A1* | 4/2005 | Park et al. ...................... 429/217 |
| 2006/0147796 A1 | 7/2006 | Miura et al. |
| 2008/0029625 A1* | 2/2008 | Talton ............................. 241/21 |
| 2008/0199777 A1* | 8/2008 | Onishi et al. ............... 429/231.8 |

FOREIGN PATENT DOCUMENTS

| CN | 1626603 A | | 6/2005 |
| JP | 4 242071 | | 8/1992 |
| JP | 5 74461 | | 3/1993 |
| JP | 7 65816 | | 3/1995 |
| JP | 2003 157847 | | 5/2003 |
| JP | 2005 285461 | | 10/2005 |
| JP | 2005285461 A | * | 10/2005 |
| JP | 2006 202724 | | 8/2006 |
| JP | 2007-12559 | | 1/2007 |
| JP | 2007-59206 | | 3/2007 |
| JP | 2009 94079 | | 4/2009 |
| JP | 2009 252385 | | 10/2009 |
| JP | 2009 252398 | | 10/2009 |
| KR | 10-1993-0010302 | | 6/1993 |
| KR | 10-2007-0069281 | | 7/2007 |

OTHER PUBLICATIONS

"Sodium Carboxymethyl Cellulose", 28th JECFA Joint FAO/WHO Expert Committee on Food Additives Monograph (1984, revised 2006) (http://www.fao.org/food-safety-quality/scientific-advice/jecfa-additives/en.).*
Perry's Chemical Engineer's Handbook, 7th Ed. (1997) McGraw-Hill; Table 19-20.*

(Continued)

*Primary Examiner* — Milton I Cano
*Assistant Examiner* — Ling R Zeng
(74) *Attorney, Agent, or Firm* — Oblon, McClelland, Maier & Neustadt, L.L.P.

(57) ABSTRACT

The present invention provides carboxymethylcellulose or a salt thereof that can prevent defects such as streaks and pinholes from occurring in the obtained electrode when it is used as a binder for an electrode of a nonaqueous electrolyte secondary battery. The present invention provides carboxymethylcellulose or a salt thereof of which ratio of a dry mass A to a dry mass B is less than 50 ppm when 2 liters of a 0.3 mass % aqueous solution of the dry mass B of the carboxymethylcellulose or a salt thereof is prepared, the entire amount of the aqueous solution is filtrated through a 250-mesh filter under a reduced pressure of −200 mmHg, and the dry mass A of a residue on the filter is measured after filtration. The applications of the carboxymethylcellulose or a salt thereof are also provided.

2 Claims, No Drawings

(56) References Cited

OTHER PUBLICATIONS

"Sodium Carboxymethyl Cellulose", Hoefler, A., Hercules Inc., Food Ingredients Group, Wilmington, DE. (p. 6) (http://class.fst.ohio-state.edu/fst621/Additive/%20classes/cmctlk.pdf).*
Machine translation of JP 2005-285461.*
JP 2005-285461.*
Extended Search Report issued Jun. 6, 2012 in European Application No. 09829116.4.
Korean Office Action issued Sep. 4, 2013, in Korea Patent Application No. 10-2011-7012003.
Chinese Office Action issued Apr. 24, 2013, in China Patent Application No. 200980147273.6.
International Search Report Issued Dec. 28, 2009 in PCT/JP09/069915 filed Nov. 26, 2009.

* cited by examiner

CARBOXYMETHYLCELLULOSE OR SALT THEREOF FOR ELECTRODES OF NONAQUEOUS ELECTROLYTE SECONDARY BATTERY AND AQUEOUS SOLUTION THEREOF

CROSS-REFERENCE TO RELATED APPLICATIONS

This application is a National Stage of PCT/JP2009/069915 filed on Nov. 26, 2009. This application is based upon and claims the benefit of priority to Japanese Application No. 2008-300318 filed on Nov. 26, 2008.

TECHNICAL FIELD

The present invention relates to carboxymethylcellulose or a salt thereof useful as a binder that can prevent defects such as streaks and pinholes from occurring on the surface of an electrode of a nonaqueous electrolyte secondary battery, and relates to an aqueous solution of the carboxymethylcellulose or a salt thereof.

BACKGROUND ART

In recent years, electronic devices, particularly portable devices such as mobile phones PDAs (personal digital assistants), and notebook personal computers, are being reduced in size, weight, and thickness and are becoming more powerful, and such portable devices are becoming widespread. As the range of use of these portable devices expands, batteries for driving the portable devices are becoming very important components. Among the batteries, nonaqueous electrolyte secondary batteries, typified by lithium ion secondary batteries, having high energy density and high capacity are widely used.

Generally, such nonaqueous electrolyte secondary batteries are produced as follows. A negative electrode containing a negative electrode active material composed of a carbon material and the like that can store and release lithium ions and a positive electrode containing a positive electrode active material composed of a lithium-containing transition metal composite oxide (such as $LiCoO_2$, $LiNiO_2$, or $LiMn_2O_4$) are formed into sheets on the surfaces of metal foils serving as collecting substrates (collectors). A sheet-shaped positive electrode and a sheet-shaped negative electrode are thereby obtained. The sheet-shaped positive electrode and the sheet-shaped negative electrode are wound or laminated through separators formed also into sheets and are stored in a case. Each of the sheet-shaped positive electrodes and the sheet-shaped negative electrodes has a structure comprising metal foil serving as a collecting substrate (collector) and a mixture layer containing an active material and formed on the surface of the metal foil. Such an electrode can be formed by coating a collector material with a negative electrode active material slurry (or paste) or positive electrode active material slurry (or paste) and drying it.

The negative electrode active material slurry (paste) contains a binder in addition to a negative electrode active material composed of a carbon material and the like that can store and release lithium ions. A binder for a negative electrode including styrene/butadiene latex (SBR) as a main component is disclosed in Patent document 1 (Japanese Patent Application Laid-Open No. Hei 5-74461) as a binder.

In Patent document 1, carboxymethylcellulose used as a water-soluble thickener is dissolved in water to prepare an aqueous solution, and SBR and a negative electrode active material are mixed into the aqueous solution to produce a slurry. The slurry used as a coating solution is applied to a substrate and dried to form a sheet-shaped negative electrode.

To produce the positive electrode of a nonaqueous electrolyte secondary battery, an organic solvent such as N-methyl-2-pyrrolidone (NMP) is conventionally used as a solvent. However, water is recently being used as the solvent to reduce handling cost and take into account the influence on the environmental load of the solvent discharged.

The positive electrode active material slurry (paste) contains a binder in addition to a conducive material such as carbon and a lithium-containing transition metal composite oxide (such as $LiCoO_2$, $LiNiO_2$, or $LiMn_2O_4$) serving as the positive electrode active material. Patent document 2 (Japanese Patent Application Laid-Open No. 2003-157847) describes cellulose of which 1% aqueous solution has a viscosity of 4,000 mPa·s or more, such as carboxymethylcellulose, as a binder. Patent document 2 describes that an active material paste is prepared by adding the carboxymethylcellulose together with a conductive material, polytetrafluoroethylene (PTFE), and other materials to pure water.

In a method for coating a collecting substrate with the negative electrode active material slurry (paste) or positive electrode active material slurry (paste), a doctor blade spaced apart by a predetermined distance from the surface of the collecting substrate to be coated is used to draw a layer of slurry in an amount corresponding to the gap between the doctor blade and the collecting substrate, and a sheet-shaped electrode plate is thereby formed (for example, as disclosed in Patent document 3 (Japanese Patent Application Laid-Open No. Hei 4-242071)).

In another proposed method, a coating solution of an electrode material is discharged and applied onto a running collecting substrate wound around a back-up roll using an extrusion-type injector with a slot nozzle (for example, as disclosed in Patent document 4 (Japanese Patent Application Laid-Open No. Hei 7-65816)).

PRIOR ART DOCUMENTS

Patent Documents

Patent document 1: Japanese Patent Application Laid-Open No. Hei 5-74461
Patent document 2: Japanese Patent Application Laid-Open No. 2003-157847
Patent document 3: Japanese Patent Application Laid-Open No. Hei 4-242071
Patent document 4: Japanese Patent Application Laid-Open No. Hei 7-65816

DISCLOSURE OF THE INVENTION

Problem to be Solved by the Invention

However, when a negative electrode active material slurry (paste) or positive electrode active material slurry (paste) is prepared by using carboxymethylcellulose as a binder and water as a solvent, undissolved carboxymethylcellulose may remain in the slurry. If an electrode is produced by depositing such a slurry (paste) containing the remaining undissolved material on a collecting substrate, streak-like defects (streaks) are formed on the surface of the applied slurry.

The problem of these streak-like defects (streaks) often occurs when a slurry (paste) is deposited on a collecting substrate using a coating method such as blade coating, bar coating, or die coating. More specifically, streak-like defects (streaks) are likely to occur when undissolved carboxymethylcellulose is caught in the gap between the collecting substrate and a coating device used in the coating method. In particular, these streak-like defects (streaks) are more likely to occur when the size of the gap is reduced for the purpose of applying a thinner layer of slurry (or paste). In recent years, to increase battery power, there is a demand for a sheet-shaped electrode plate to reduce the thickness of a mixture layer formed on a collecting substrate and increase the surface area of the mixture layer. Therefore, it has been desired to suppress streak-like defects, particularly when a thin layer of slurry is applied.

If the undissolved material described above passes through the gap and is applied to the collecting substrate, peeling tends to occur at points around the applied undissolved material during a compression step for the electrode plate. In addition, the undissolved material shrinks during a drying step after application, and therefore voids tend to occur. Such peeling and voids could cause defects such as pinholes.

It is known that a treatment such as filtering a slurry (or paste) before application to a collecting substrate can remove the undissolved material to some extent. However, the undissolved material is often a soft polymer and can pass through the filter when pressure (back pressure) is applied during the filter treatment. Therefore, it is not easy to remove the undissolved material sufficiently. Moreover, the filter is likely to be clogged during the filter treatment, so that the efficiency of removing the undissolved material is significantly lowered. Therefore, much effort is required for the filter management during operation to maintain the productivity of the battery electrode.

Means for Solving the Problem

An object of the present invention is providing carboxymethylcellulose or a salt thereof that, when used as a binder for an electrode of a nonaqueous electrolyte secondary battery, can prevent defects such as streaks and pinholes which can occur in the electrode to be obtained.

As a result of extensive studies, the following has been found. Carboxymethylcellulose or a salt thereof in an amount of B (dry mass B) is dissolved in water to prepare 2 liters of a 0.3 mass % aqueous solution, and the entire amount of the aqueous solution is filtrated through a 250-mesh filter under a reduced pressure of −200 mmHg, and then the dry mass A of the residue on the filter after the filtration is measured. When the ratio of the dry mass A to the dry mass B is less than 50 ppm, using an electrode composition containing this aqueous solution to produce the electrode for a nonaqueous electrolyte secondary battery can suppress the occurrence of defects such as streaks and pinholes on the surface of the electrode, resulting in preventing a reduction in productivity of the battery electrodes.

Specifically, the present invention provides the following invention.

[1] Carboxymethylcellulose or a salt thereof used as a binder for an electrode of a nonaqueous electrolyte secondary battery, wherein a ratio of a dry mass A to a dry mass B is less than 50 ppm when 2 liters of a 0.3 mass % aqueous solution of the dry mass B of the carboxymethylcellulose or a salt thereof is prepared, the entire amount of the aqueous solution is filtrated through a 250-mesh filter under a reduced pressure of −200 mmHg, and the dry mass A of a residue on the filter is measured after filtration.

[2] The carboxymethylcellulose or a salt thereof according to the above [1], wherein the carboxymethylcellulose or a salt thereof is a mechanically pulverized product.

[3] The carboxymethylcellulose or a salt thereof according to the above [1] or [2], wherein the carboxymethylcellulose or a salt thereof has a volume cumulative 100% particle diameter of less than 50 $\mu$m as measured by a laser diffraction-scattering particle size distribution meter using methanol as a dispersion medium.

[4] An aqueous solution used for a binder for an electrode of a nonaqueous electrolyte secondary battery, wherein the aqueous solution comprising the carboxymethylcellulose or a salt thereof according to any one of the above [1] to [3].

[5] A method of manufacturing an aqueous solution used for a binder for an electrode of a nonaqueous electrolyte secondary battery, the method comprising: subjecting carboxymethylcellulose or a salt thereof to a mechanical pulverization treatment to obtain a pulverized product of the carboxymethylcellulose or a salt thereof; and dissolving the pulverized product of the carboxymethylcellulose or a salt thereof in water.

[6] The manufacturing method according to the above [5], wherein the pulverization treatment is a dry pulverization treatment or a wet pulverization treatment.

[7] The manufacturing method according to the above [5] or [6], wherein the pulverized product of the carboxymethylcellulose or a salt thereof has a volume cumulative 100% particle diameter of less than 50 $\mu$m as measured by a laser diffraction-scattering particle size distribution meter using methanol as a dispersion medium.

[8] The method of manufacturing according to any one of the above [5] to [7], wherein the pulverized product of the carboxymethylcellulose or a salt thereof has a ratio of the dry mass A to the dry mass B that is less than 50 ppm when 2 liters of a 0.3 mass % aqueous solution of a dry mass B of the pulverized product of the carboxymethylcellulose or a salt thereof is prepared, the entire amount of the aqueous solution is filtrated through a 250-mesh filter under a reduced pressure of −200 mmHg, and a dry mass A of a residue on the filter is measured after filtration.

[9] An electrode composition for a nonaqueous electrolyte secondary battery, the electrode composition comprising the aqueous solution according to claim 4 or the aqueous solution according to any one of the above [5] to [8].

[10] An electrode for a nonaqueous electrolyte secondary battery, the electrode formed from the electrode composition according to the above [9].

[11] A method of manufacturing an electrode for a nonaqueous electrolyte secondary battery, the method comprising depositing the electrode composition according to the above [9] on a collecting substrate.

[12] A nonaqueous electrolyte secondary battery comprising the electrode according to the above [11].

Effect of the Invention

The carboxymethylcellulose or a salt thereof of the present invention is preferably used to manufacture an electrode for a nonaqueous electrolyte secondary battery. More specifically, the addition of the carboxymethylcellulose serving as a binder to an electrode composition such as an electrode active material slurry (or paste) can reduce the number of coarse undissolved materials originating from the carboxymethylcellulose and salts thereof in the electrode composition. As a result, the occurrence of defects such as streaks is suppressed, peeling, and pinholes on the surface of the electrode. Therefore, the use of the carboxymethylcellulose or a salt thereof of the present invention can omit filtration through a filter for removal of the undissolved material that is conventionally performed when the electrode is formed using an electrode active material slurry (paste). A reduction in electrode productivity can thereby be prevented, and the effort on filter management can be reduced.

BEST MODE(S) FOR CARRYING OUT THE INVENTION

[Carboxymethylcellulose]

In the present invention, carboxymethylcellulose or a salt thereof has a structure in which hydroxyl groups in the glucose residues constituting the cellulose are substituted with carboxymethyl ether groups. The carboxymethylcellulose may be in the form of a salt. Examples of the salt of the carboxymethylcellulose may include metal salts such as sodium carboxymethylcellulose.

In the present invention, cellulose means a polysaccharide having a structure including $\beta$, 1-4 linked D-glucopyranose units (also simply referred to as "glucose residues" or "anhydrous glucose residues"). Generally, cellulose is classified by its origin, production method, and the like into natural cellulose, regenerated cellulose, fine cellulose, microcrystalline cellulose obtained by removing amorphous parts, and the like.

Examples of the natural cellulose may include: bleached pulp and unbleached pulp (bleached wood pulp and unbleached wood pulp); linter and purified linter; and cellulose produced by microorganisms such as acetobacter. No particular limitation is imposed on the raw materials for the bleached pulp and unbleached pulp, and examples of the raw materials may include wood, cotton, straw, and bamboo. No particular limitation is imposed on the methods of manufacturing the bleached pulp and unbleached pulp, and any of mechanical methods, chemical methods, and intermediate combinations of mechanical and chemical methods may be employed. Examples of the bleached pulp and unbleached pulp may include mechanical pulp, chemical pulp, ground pulp, sulfite pulp, and kraft pulp, which are classified by their manufacturing methods. Moreover, dissolving pulp, as well as paper pulp, may be used. The dissolving pulp is chemically refined pulp that is mainly used as a solution in a chemical and is used as the main raw materials for artificial fiber, cellophane, and the like.

Examples of the regenerated cellulose may include cellulose prepared by dissolving cellulose in a solvent such as a cuprammonium solution, a cellulose xanthate solution, or a morpholine derivative and then re-spinning the resultant cellulose.

Examples of the fine cellulose may include: a fine cellulose obtained by subjecting a cellulose-based material, such as the above described natural cellulose or regenerated cellulose, to depolymerization treatment (such as acid hydrolysis, alkaline hydrolysis, enzymatic decomposition, explosion treatment, or vibratory ball milling treatment); and a fine cellulose obtained by subjecting the above cellulose-based material to a mechanical treatment.

In the carboxymethylcellulose or a salt thereof, the ratio of mass A to mass B is less than 50 ppm. Here, the mass A is defined as follows: the entire amount of 2 liters of a 0.3 mass % aqueous solution of the carboxymethylcellulose or a salt thereof is filtrated through a 250-mesh filter under a reduced pressure of −200 mmHg and the residue on the filter is dried to measure the dry mass being the mass A. The mass B is the mass of the carboxymethylcellulose or a salt thereof dissolved in the aqueous solution. If the ratio is 50 ppm or more, an electrode formed using the carboxymethylcellulose or a salt thereof may have appearance defects such as streaks and pinholes, and this may cause a reduction in battery quality. No particular limitation is imposed on the lower limit of the ratio of the mass A to the mass B. The smaller the ratio, the better.

Preferably, the carboxymethylcellulose or a salt thereof is water-soluble. More specifically, the carboxymethylcellulose or a salt thereof has a degree of substitution with carboxymethyl per anhydrous glucose unit of preferably 0.45 or more, and more preferably 0.6 or more. If the degree of substitution with carboxymethyl is less than 0.45, the carboxymethylcellulose or a salt thereof may not sufficiently dissolve in water. In the present invention, the anhydrous glucose units refer to individual anhydrous glucose residues (glucose residues) that constitute the cellulose. The degree of substitution with carboxymethyl (also referred to as the degree of etherification) refers to the ratio of hydroxyl groups (—OH groups) in the glucose residues constituting the cellulose that have been substituted with carboxymethyl ether groups (—OCH$_2$COOH). The degree of substitution with carboxymethyl may be abbreviated as DS.

In the carboxymethylcellulose or a salt thereof, no particular limitation is imposed on the upper limit of the degree of substitution with carboxymethyl per anhydrous glucose unit. However, the degree of substitution is preferably 2.0 or less, more preferably 1.5 or less, and most preferably 1.0 or less.

The degree of substitution with carboxymethyl can be examined by measuring the amount of a base such as sodium hydroxide required to neutralize carboxymethylcellulose in a sample. If the carboxymethyl ether groups in the carboxymethylcellulose or a salt thereof are in a salt form, conversion is performed before the measurement to obtain carboxymethylcellulose. A suitable combination of back titration with a base or an acid and an indicator such as phenolphthalein may be used for the measurement.

In the present invention, a 1 mass % aqueous solution of the carboxymethylcellulose or a salt thereof has a viscosity of preferably 1,000 to 20,000 mPa·s as measured at 25° C. by a B-type viscometer, more preferably 1,500 to 15,000 mPa·s, and furthermore preferably 2,000 to 10,000m Pa·s.

In the present invention, no limitation is imposed on the method of manufacturing the carboxymethylcellulose or a salt thereof, and any known method of manufacturing carboxymethylcellulose or a salt thereof may be used. Specifically, the carboxymethylcellulose or a salt thereof of the present invention can be produced by treating cellulose used as a raw material with a mercerizing agent (an alkali) to prepare mercerized cellulose (alkali cellulose) and then adding an etherifying agent to initiate etherification reaction.

No particular limitation is imposed on the cellulose used as the raw material, and any of the types of cellulose described above can be used. High-purity cellulose is preferred, and dissolving pulp and linter are particularly preferably used. The use of such cellulose results in obtaining high-purity carboxymethylcellulose or a salt thereof.

An alkali metal hydroxide such as sodium hydroxide or potassium hydroxide may be used as the mercerizing agent. Monochloroacetic acid, sodium monochloroacetate, and the like may be used as the etherifying agent.

In a general method of manufacturing water-soluble carboxymethylcellulose, the molar ratio of the mercerizing agent to the etherifying agent is generally 2.00 to 2.45 when monochloroacetic acid is used as the etherifying agent. One reason of this is that, if the molar ratio is less than 2.00, the etherification reaction may not proceed unsufficiently, so that unreacted monochloroacetic acid may remain and be wasted. Another reason is that, if the ratio is more than 2.45, a side reaction between the excess mercerizing agent and the monochloroacetic acid may proceed to generate alkali metal glycolate, resulting in an economical disadvantage.

In the present invention, commercial carboxymethylcellulose or a salt thereof may be used without any treatment or used after being subjected to any necessary treatment. Examples of the commercial product include SUNROSE (trade name, sodium salt of carboxymethylcellulose), a product of NIPPON PAPER CHEMICALS Co., Ltd.).

[Pulverization Treatment]

In the present invention, the above-described carboxymethylcellulose or a salt thereof may be used without any treatment. However, the carboxymethylcellulose or a salt thereof may be a pulverized product, which has been subjected to a pulverization treatment. Generally, the pulverization treatment is a mechanical pulverization treatment preformed using a machine. Examples of the pulverization treatment method for the carboxymethylcellulose or a salt thereof may include a dry pulverization method performed on powder and a wet pulverization method performed on a liquid dispersion or solution. In the present invention, any of these may be selected.

When an aqueous solution of the carboxymethylcellulose or a salt thereof is prepared, gel particles originating from the carboxymethylcellulose or a salt thereof remain present as undissolved particles in the aqueous solution. By subjecting the carboxymethylcellulose or a salt thereof to a wet or dry mechanical pulverization treatment, the gel particles in an aqueous solution of the mechanically pulverized carboxymethylcellulose or a salt thereof are reduced in size. As a result, when an electrode is formed using an aqueous solution of a mechanically pulverized product of the carboxymethylcellulose or a salt thereof, coarse undissolved materials may be suppressed which cause defects such as streak-like defects (streaks), peeling and pinholes which occur on the surface of the electrode.

Examples of the pulverizing apparatus that can be used for a mechanical pulverization treatment in the present invention include the following dry pulverizers and wet pulverizers.

Examples of the dry pulverizer may include a cutting mill, an impact mill, a jet mill, and a media mill. These may be used alone or in combination, or a plurality of the dry pulverizers of the same type may be used successively. However, a jet mill is preferred.

Examples of the cutting mill may include a mesh mill (manufactured by HORAI Co., Ltd.), ATOMS (manufactured by K. K. Yamamoto Hyakuma Seisakusho), a knife mill (manufactured by PALLMANN), a granulator (manufactured by HERBOLD), and a rotary cutter mill (manufactured by NARA MACHINERY Co., Ltd.).

Examples of the impact mill may include a pulverizer (manufactured by Hosokawa Micron Corporation), a fine impact mill (manufactured by Hosokawa Micron Corporation), a super micron mill (manufactured by Hosokawa Micron Corporation), a sample mill (manufactured by Seishin Enterprise Co., Ltd.), a bantam mill (manufactured by Seishin Enterprise Co., Ltd.), an atomizer ((manufactured by Seishin Enterprise Co., Ltd.), a tornado mill (NIKKISO Co., Ltd.), a turbo mill (manufactured by TURBO KOGYO CO., LTD.), and a bevel impactor (manufactured by AIKAWA Iron Works Co., Ltd).

Examples of the jet mill may include a CGS-type jet mill (manufactured by Mitsui Mining Co., Ltd.), a jet mill (manufactured by Sansho Industry Co., Ltd.), EBARA jet micronizer (manufactured by EBARA CORPORATION), Ceren Miller (manufactured by MASUKO SANGYO Co., Ltd.), and an ultrasonic jet mill (manufactured by Nippon Pneumatic Mfg. Co., Ltd.).

Examples of the media mill may include a vibratory ball mill.

Examples of the wet pulverizer may include Mass Collider (manufactured by MASUKO SANGYO Co., Ltd.), a high-pressure homogenizer (manufactured by SANMARU MACHINERY Co., Ltd.), and a media mill. Examples of the media mill may include a bead mill (manufactured by AIMEX Co., Ltd.).

[Particle Diameter of Carboxymethylcellulose]

In the present invention, a small particle diameter of the carboxymethylcellulose or a salt thereof is preferable. Specifically, the value of the volume cumulative 100% particle diameter (hereinafter, in this description, may be referred to as a "maximum particle diameter") measured by a laser diffraction-scattering particle size distribution meter using methanol as a dispersion medium is preferably less than 50 µm and more preferably less than 45 µm. If the maximum particle diameter of the carboxymethylcellulose or a salt thereof is 50 µm or more, the amount of undissolved particles in the aqueous solution of the carboxymethylcellulose or a salt thereof tends to increase.

In the present invention, the carboxymethylcellulose or a salt thereof may be subjected to a granulation treatment. This facilitates handling thereof. The granulation treatment may cause the maximum particle diameter of the carboxymethylcellulose or a salt thereof to be 50 µm or more. However, the maximum particle diameter of the carboxymethylcellulose or a salt thereof before the granulation treatment is preferably less than 50 µm.

No particular limitation is imposed on the lower limit of the maximum particle diameter. The smaller the maximum particle diameter, the more preferable, so long as it is greater than 0.

The volume cumulative 50% particle diameter (hereinafter referred to as an average particle diameter) of the carboxymethylcellulose or a salt thereof measured by a laser diffraction-scattering particle size distribution meter using methanol as a dispersion medium is generally 30 µm or less, preferably 20 µm or less, and more preferably 15 µm or less. No particular limitation is imposed on the lower limit of the average particle diameter. However, the average particle diameter is generally 5 µm or more, preferably 10 µm or more, and more preferably 12 µm or more.

In the present invention, the carboxymethylcellulose or a salt thereof may be classified according to a particle diameter (preferably the maximum particle diameter). The classification means a treatment for sieving and separating particles to be classified into particles with a certain particle diameter or more and particles with the certain particle diameter or less.

Preferably, the classification is performed according to whether the diameters of particles are less than 50 µm as a reference value or a maximum particle diameter, or 50 µm or more. In this manner, carboxymethylcellulose or a salt thereof with a maximum particle diameter of less than 50 µm can be selectively collected.

When a pulverized product of carboxymethylcellulose or a salt thereof is used as the above-described carboxymethylcellulose or a salt thereof, no particular limitation is imposed on the timing of the classification. The classification may be performed during the pulverization treatment or after the pulverization treatment.

For classification any known classification method, for example, a method using a dry classifier or a wet classifier, may be used. Examples of the dry classifier may include a cyclone classifier, a DS separator, a turbo classifier, a micro separator, and an air separator. Examples of the wet classifier include a liquid cyclone classifier, a centrifugal settler, and a hydro-oscillator. A dry classifier is preferred, and a cyclone classifier is more preferred.

[Nonaqueous Electrolyte Secondary Battery]

In the present invention, the carboxymethylcellulose or a salt thereof has properties preferable as a binder for an electrode of a nonaqueous electrolyte secondary battery. Generally, an aqueous solution containing the carboxymethylcellulose or a salt thereof is used as a binder for an electrode of a nonaqueous electrolyte secondary battery.

The concentration of the carboxymethylcellulose or a salt thereof in the aqueous solution thereof is generally 0.1 to 10 mass %, preferably 0.2 to 4 mass %, and more preferably 0.5 to 2 mass %.

No particular limitation is imposed on the production conditions of the aqueous solution of the carboxymethylcellulose or a salt thereof. For example, the aqueous solution is prepared by adding the carboxymethylcellulose or a salt thereof to water (such as distilled water, purified water, or tap water) and dissolving it in the water, if necessary, under stirring or the like.

In the present invention, the carboxymethylcellulose or a salt thereof may serve as a binder for an electrode and can form, together with an electrode active material, an electrode composition. No particular limitation is imposed on the form of the electrode composition, and it can be any of a slurry form and a paste form.

In the present invention, the amount of the carboxymethylcellulose or a salt thereof in the electrode composition is preferably 0.1 to 4.0 mass % based on the total amount of the electrode composition.

The electrode composition may contain various components selected according to whether the electrode formed by the composition is a negative electrode or a positive electrode.

Generally, an electrode composition for a negative electrode contains a negative electrode active material. Examples usable as the negative electrode active material may include: graphite materials such as graphite (natural graphite and artificial graphite), coke, and carbon fibers; elements that can be alloyed with lithium, i.e., elements such as Al, Si, Sn, Ag, Bi, Mg, Zn, In, Ge, Pb, and Ti; compounds containing the above elements that can be alloyed with lithium; composite materials of the above compounds containing the elements that can be alloyed with lithium with carbon and/or the above graphite materials; and nitrides containing lithium. Among them, graphite materials are preferred, and graphite is more preferred.

Generally, an electrode composition for a positive electrode contains a positive electrode active material. Preferably, the positive electrode active material is a $LiMe_xO_y$-based positive electrode active material (where Me means a transition metal including at least one of Ni, Co, and Mn. x and y mean any numbers). No particular limitation is imposed on the $LiMe_xO_y$-based positive electrode active material. However, $LiMn_2O_4$-based, $LiCoO_2$-based, and $LiNiO_2$-based positive electrode active materials are preferred. Examples of the $LiMn_2O_4$-based, $LiCoO_2$-based, and $LiNiO_2$-based positive electrode active materials may include compounds obtained by substituting metal elements of $LiMnO_2$, $LiMn_2O_4$, $LiCoO_2$, or $LiNiO_2$ serving as main skeletons. The $LiMn_2O_4$-based, $LiCoO_2$-based, and $LiNiO_2$-based positive electrode active materials have good performance as positive electrode active materials, such as good performance that allows electrons and lithium ions to diffuse, and therefore can provide lithium ion secondary batteries having high charge-discharge efficiency and good cycle characteristics. Among them, the $LiCoO_2$-based positive electrode active material is preferred, and $LiCoO_2$ is more preferred. The $LiMn_2O_4$-based positive electrode active material is also preferably used because of its low material cost.

The amount of an active material in each electrode composition is generally 90 to 99 mass %, preferably 91 to 99 mass %, and more preferably 92 to 99 mass %.

Preferably, the electrode composition for a positive electrode contains a conductive material. When the electrode composition contains a conductive material, the properties of the positive electrode produced are improved. The conductive material can ensure the electrical conduction of the positive electrode. Examples of the conductive material include carbon materials such as carbon black, acetylene black, and graphite. These may be used alone or as a mixture of two or more. Of these, carbon black is preferred.

Each electrode composition may contain a binder other than an aqueous solution of carboxymethylcellulose or a salt thereof. Examples of the binder for the electrode composition for a negative electrode may include synthetic rubber-based binders. At least one selected from the group consisting of styrene-butadiene rubber (SBR), nitrile-butadiene rubber, methylmethacrylate-butadiene rubber, chloroprene rubber, carboxy modified styrene-butadiene rubber, and latexes of these synthetic rubbers may be used as the synthetic rubber-based binder. Among them, styrene-butadiene rubber (SBR) is preferred. Examples of the binder for the electrode composition for a positive electrode may include, in addition to the synthetic rubber-based binders shown as the foregoing binder for a negative electrode, polytetrafluoroethylene (PTFE). Among them, polytetrafluoroethylene (PTFE) is preferred.

The amount of the binder in each electrode composition is generally 1 to 10 mass %, preferably 1 to 6 mass %, and more preferably 1 to 2 mass %.

No particular limitation is imposed on the production conditions of each electrode composition. For example, to an aqueous solution of the carboxymethylcellulose or a salt thereof other components that constitute an electrode composition are added, and the resultant solution is mixed under stirring if necessary.

No particular limitation is imposed on the form of each electrode composition. For example, each electrode composition may be in any of a liquid form, paste form, slurry form, and the like.

The electrode compositions are used to produce the electrodes of a nonaqueous electrolyte secondary battery. The electrodes for a nonaqueous electrolyte secondary battery may be produced by a method in which the electrode compositions are deposited on collecting substrates (collectors). Examples of the deposition method may include blade coating, bar coating, and die coating, and blade coating is preferred. Examples of the blade coating may include a method in which an electrode composition is casted on a collecting substrate using a coating device such as a doctor blade. The deposition method is not limited to the above specific examples. In another example of the deposition method, the above electrode composition is discharged and applied onto a running collecting substrate wound around on a back-up roll using an extrusion-type injector with a slot nozzle. In blade coating, drying by, for example, heating (at a heating temperature of, for example, 80 to 120° C. for a heating time of, for example, 4 to 12 hours) and applying pressure with a roller press may be performed if necessary after casting.

As each collecting substrate, any electrical conductor can be used so long as it does not cause any fatal chemical change in the formed battery.

Any of stainless steel, nickel, copper, titanium, carbon, and copper or stainless steel having a surface subjected to an adhesion treatment with carbon, nickel, titanium, or silver may be used as the collecting substrate for the negative electrode active material. Among these, copper or a copper alloy is preferred, and copper is most preferred.

Examples of the material for the collecting substrate for the positive electrode may include metals such as aluminum and stainless steel, and aluminum is preferred. A collecting substrate in a form of net, punched metal, foamed metal, or plate-shaped foil may be used, and plate-shaped foil is preferred.

No particular limitation is imposed on the shapes of the electrodes for a nonaqueous electrolyte secondary battery that are formed of the electrode compositions, but the electrodes are generally in a sheet form. The thickness of such a sheet-shaped electrode plate (the thickness of a mixture layer formed of an electrode composition, excluding the thickness of a collecting substrate) is difficult to specify because it depends on the chemical composition of the composition, the production conditions, or the like. However, the thickness is generally 30 to 150 μm.

The electrodes formed from the above-described compositions are used as the electrodes of a nonaqueous electrolyte secondary battery. Specifically, the present invention also provides a nonaqueous electrolyte secondary battery including electrodes formed from the above-described compositions. The nonaqueous electrolyte secondary battery may have a structure in which a positive electrode and a negative electrode are alternately laminated through separators and wound many turns. Generally, the separators are impregnated with a nonaqueous electrolyte. A negative electrode and/or a positive electrode formed from the above-described electrode compositions may be used as the above negative electrode and/or positive electrode. In this nonaqueous electrolyte secondary battery, carboxymethylcellulose or a salt thereof having good solubility is used. Therefore, a step of filtration through a filter or a similar step can be omitted, and good productivity is obtained. In addition, the initial irreversible capacity is significantly improved, and high battery characteristics can be obtained.

EXAMPLES

The embodiments of the present invention will next be described by way of Examples, but the present invention is not limited thereto.

In this description, various indicators are measured by the following methods.

<Measurement of the Mass Ratio of the Mass of a Filtration Residue to the Dry Mass of Carboxymethylcellulose Dissolved in an Aqueous Solution>

Two liters of a 0.3 mass % aqueous solution of carboxymethylcellulose or a salt thereof (percent by mass of the dry mass of the carboxymethyl or a salt thereof) was prepared. Two liters of the prepared aqueous solution was filtrated through a 250-mesh filter (made of stainless steel, aperture: 63 μm) under a reduced pressure of −200 mmHg using a filtration apparatus ("Sepa-rohto," product of Kiriyama glass Co.). The residue remaining on the 250-mesh filter was blow-dried at a temperature of 105° C. for 16 hours. Then the mass of the dried residue was measured and represented by mass percent (ppm) based on the mass of the carboxymethylcellulose in the aqueous solution thereof.

<Measurement of Maximum Particle Diameter, Average Particle Diameter, and Particle Size Distribution>

The maximum particle diameter and average particle diameter of carboxymethylcellulose were measured using a laser diffraction-scattering particle size distribution meter (Microtrac, Model-9220-SPA, product of NIKKISO Co., Ltd.). The maximum particle diameter refers to the value of the volume cumulative 100% particle diameter, and the average particle diameter refers to the value of the volume cumulative 50% particle diameter. To perform the measurement, the sample was dispersed in methanol and subjected to an ultrasonic treatment for 1 minute or longer, and then the measurement was performed.

Production Example 1

Commercial carboxymethylcellulose (B-type viscosity of a 1 mass % aqueous solution at 25° C.: 3,500 mPa·s, degree of substitution with carboxymethyl: 0.87, product name: "SUNROSE," product of NIPPON PAPER CHEMICALS Co., Ltd.) was subjected to a dry pulverization treatment using a jet mill and then to a cyclone classifier to obtain a pulverized product of the carboxymethylcellulose having an average particle diameter of 8 μm and a maximum particle diameter of 31 μm. The mass ratio of the pulverized product was 8 ppm.

Production Example 2

Commercial carboxymethylcellulose (B-type viscosity of a 1 mass% aqueous solution at 25° C.: 3,500 mPa·s, degree of substitution with carboxymethyl: 0.87, product name: "SUNROSE," product of NIPPON PAPER CHEMICALS Co., Ltd.) was subjected to a dry pulverization treatment using a jet mill and then to a cyclone classifier to obtain a pulverized product of the carboxymethylcellulose having an average particle diameter of 25 μm and a maximum particle diameter of 44 μm. The mass ratio of the pulverized product was 48 ppm.

Production Example 3

Distilled water was added to commercial carboxymethylcellulose (B-type viscosity of a 1 mass % aqueous solution at 25° C.: 3,500 mPa·s, degree of substitution with carboxymethyl: 0.87, product name: "SUNROSE," product of NIPPON PAPER CHEMICALS Co., Ltd.) such that a 1 mass % aqueous solution was obtained, and the mixture was stirred to dissolve the carboxymethylcellulose. Then the aqueous solution was subjected to a grinding treatment using Mass Collider to obtain a 1 mass % aqueous solution of the pulverized carboxymethylcellulose. The mass ratio for the obtained aqueous solution was 4 ppm.

Example 1

Ninety seven mass % of graphite powder, 1.5 mass % of a styrene-butadiene rubber (SBR) dispersion (in terms of SBR) used as a binder, and 1.5 mass % of the pulverized product of the carboxymethylcellulose prepared in Production Example 1 were weighed. First, distilled water was added to the carboxymethylcellulose such that a 1 mass % aqueous solution was obtained, and the mixture was stirred to dissolve the carboxymethylcellulose. Next, the pre-weighed graphite powder and styrene-butadiene rubber (SBR) were mixed with the aqueous carboxymethylcellulose solution, and ceramic balls were added thereto. The mixture was placed in a plastic bottle and was well kneaded for 10 hours. Then the mixture was casted on a copper foil of 15 cm width, 30 cm length, and 12 μm thickness using a doctor blade spaced apart by 150 μm to obtain a negative electrode. The negative electrode was placed in an oven at about 90° C. and dried for about 10 hours. The electrode plate was then pressed using a roller press to produce a negative electrode plate (a sheet-shaped negative electrode) having a thickness of 70 μm (the thickness of the composition, excluding the thickness of the copper foil). The surface state of the obtained negative electrode plate was visually observed. If no defects such as streaks and pinholes were found, the surface state was represented by a circle (o). If bad appearance caused by streaks and pinholes was observed, the surface state was represented by a cross (x).

Example 2

The same procedure as in Example 1 was repeated using the pulverized product of the carboxymethylcellulose obtained in Production Example 2.

Example 3

Ninety seven mass % of graphite powder, 1.5 mass % of a styrene-butadiene rubber (SBR) dispersion (in terms of SBR) used as a binder, and 1.5 mass % of the aqueous solution of the pulverized product of the carboxymethylcellulose prepared in Production Example 3 (in terms of the carboxymethylcellulose) were weighed. The pre-weighed graphite powder and the styrene-butadiene rubber (SBR) were mixed with the aqueous solution of the pulverized product of the carboxymethylcellulose, and ceramic balls were added thereto. The mixture was placed in a plastic bottle and was well kneaded for 10 hours. Then the same procedure as in Example 1 was repeated.

Example 4

Ninety four mass % of $LiCoO_2$, 2 mass % of a polytetrafluoroethylene (PTFE) dispersion (in terms of PTFE) used as a binder, 2 mass % of the pulverized product of the carboxymethylcellulose prepared in Production Example 1, and 2 mass % of a conductive material (carbon black) for improving the migration of electrons were weighed. First, distilled water was added to the pulverized product of the carboxymethylcellulose such that a 1 mass % aqueous solution was obtained, and the mixture was stirred to dissolve the carboxymethylcellulose. Next, the pre-weighed $LiCoO_2$, polytetrafluoroethylene (PTFE), and the carbon conductive material, together with ceramic balls, were added to the aqueous carboxymethylcellulose solution. The mixture was placed in a plastic bottle and was well kneaded for 10 hours. Then the mixture was casted on an aluminum foil of 15 cm width, 30 cm length, and 15 μm thickness using a doctor blade spaced apart by 150 μm to obtain a positive electrode plate. The positive electrode plate was placed in an oven at about 90° C. and dried for about 10 hours. The dried positive electrode plate was then pressed using a roller press to produce a positive electrode plate (a sheet-shaped positive electrode) having a thickness of 73 μm (the thickness of the composition, excluding the thickness of the aluminum foil). The surface state of the obtained negative electrode plate was visually observed. If no defects such as streaks and pinholes were found, the surface state was represented by a circle (o). If bad appearance caused by streaks and pinholes was observed, the surface state was represented by a cross (x).

Example 5

The same procedure as in Example 4 was repeated using the pulverized product of the carboxymethylcellulose prepared in Production Example 2.

Example 6

Ninety four mass % of $LiCoO_2$, 2 mass % of a polytetrafluoroethylene (PTFE) dispersion (in terms of PTFE) used as a binder, 2 mass % of the aqueous solution of the pulverized product of the carboxymethylcellulose prepared in Production Example 3 (in terms of carboxymethylcellulose), and 2 mass % of a conductive material (carbon black) for improving the migration of electrons were weighed. The pre-weighed $LiCoO_2$, polytetrafluoroethylene (PTEF), and the carbon conductive agent were mixed with the aqueous solution of the pulverized product of the carboxymethylcellulose solution, and ceramic balls were added thereto. The mixture was placed in a plastic bottle and was well kneaded for 10 hours. Then the same procedure as in Example 4 was repeated.

Comparative Example 1

The same procedure as in Example 1 was repeated except that the commercial carboxymethylcellulose (B-type viscosity of a 1 mass % aqueous solution at 25° C.: 3,500 mPa·s, degree of substitution with carboxymethyl: 0.87, product name: "SUNROSE," product of NIPPON PAPER CHEMICALS Co., Ltd.) was used without any treatment. The mass ratio of the commercial carboxymethylcellulose was 250 ppm.

Comparative Example 2

The same procedure as in Example 3 was repeated except that the commercial carboxymethylcellulose (B-type viscosity of a 1 mass % aqueous solution at 25° C.: 3,500 mPa·s, degree of substitution with carboxymethyl: 0.87, product name: "SUNROSE," product of NIPPON PAPER CHEMICALS Co., Ltd.) was used without any treatment. The mass ratio of the commercial carboxymethylcellulose was 250 ppm.

The properties of the carboxymethylcellulose used in the Examples and the Comparative Examples and the results of evaluation of the surface states of the electrode plates are shown in Table 1.

TABLE 1

PROPERTIES OF CARBOXYMETHYLCELLULOSE AND SURFACE STATE OF ELECTRODE PLATE

| | MAXIMUM PARTICLE DIAMETER | AMOUNT OF FILTRATION RESIDUE | SURFACE STATE OF ELECTRODE PLATE |
|---|---|---|---|
| EXAMPLE 1 | 31 | 8 | o |
| EXAMPLE 2 | 44 | 45 | o |
| EXAMPLE 3 | — | 4 | o |
| EXAMPLE 4 | 31 | 8 | o |
| EXAMPLE 5 | 44 | 45 | o |
| EXAMPLE 6 | — | 4 | o |
| COMPARATIVE EXAMPLE 1 | 249 | 250 | x |
| COMPARATIVE EXAMPLE 2 | 249 | 250 | x |

The invention claimed is:
1. A carboxymethylcellulose or a carboxylmethylcellulose salt, wherein:
when 2 liters of a 0.3 mass % aqueous solution of the carboxymethylcellulose or the carboxymethylcellulose salt having a dry mass B is prepared, and an entire amount of the aqueous solution is filtered through a 250-mesh filter under a reduced pressure of −200 mmHg, and a residue on the 250-mesh filter is measured to have a dry mass A after the filtration, then a ratio of the dry mass A to the dry mass B is less than 50 ppm;

the carboxymethylcellulose or the carboxylmethylcellulose salt has a volume cumulative 100% particle diameter of 31 μm or more and less than 50 μm, as measured by a laser diffraction-scattering particle size distribution meter with methanol as a dispersion medium;

the carboxymethylcellulose or the carboxylmethylcellulose salt satisfies all of the following (1), (2) and (3):

(1) has a degree of substitution with carboxymethyl per anhydrous glucose unit of 0.45 or more, (2) has a degree of substitution with carboxymethyl per anhydrous glucose unit of 2.0 or less;

(3) a 1 mass % aqueous solution of the carboxymethylcellulose or the carboxymethylcellulose salt has a viscosity of 1,000 to 20,000 m Pa·s as measured at 25° C. by a B-type viscometer; and the carboxymethylcellulose or the carboxylmethylcellulose salt is adapted to function as a binder for an electrode of a nonaqueous electrolyte secondary battery.

2. The carboxymethylcellulose or the carboxymethylcellulose salt of claim 1, in the form of a mechanically pulverized product.

\* \* \* \* \*